United States Patent
Choi et al.

(10) Patent No.: US 9,553,634 B2
(45) Date of Patent: Jan. 24, 2017

(54) ELECTRICAL DUPLEX TO OPTICAL CONVERSION

(71) Applicant: Lattice Semiconductor Corporation, Portland, OR (US)

(72) Inventors: Joohong Choi, Stanford, CA (US); Kihong Kim, San Jose, CA (US); Gyudong Kim, Sunnyvale, CA (US); Chandlee B. Harrell, Los Altos, CA (US)

(73) Assignee: Lattice Semiconductor Corporation, Portland, OR (US)

( * ) Notice: Subject to any disclaimer, the term of this patent is extended or adjusted under 35 U.S.C. 154(b) by 0 days.

(21) Appl. No.: 14/563,797

(22) Filed: Dec. 8, 2014

(65) Prior Publication Data

US 2016/0164572 A1    Jun. 9, 2016

(51) Int. Cl.
*H04B 3/20* (2006.01)

(52) U.S. Cl.
CPC ..................... *H04B 3/20* (2013.01)

(58) Field of Classification Search
None
See application file for complete search history.

(56) References Cited

U.S. PATENT DOCUMENTS

| | | | | |
|---|---|---|---|---|
| 2005/0069327 A1* | 3/2005 | Franck | ............... | H04B 10/2503 398/141 |
| 2005/0078963 A1* | 4/2005 | Lenosky | ............... | H04B 10/43 398/139 |
| 2013/0223293 A1* | 8/2013 | Jones | ........................ | H04L 5/14 370/276 |

OTHER PUBLICATIONS

"Echo Suppression and Cancellation," Wikipedia®, Last Modified Apr. 20, 2015, 7 pages [Online] [Retrieved Jun. 16, 2015] Retrieved from the Internet<URL: https://en.wikipedia.org/wiki/Echo_suppression_and_cancellation>.

* cited by examiner

*Primary Examiner* — Diane Lo
(74) *Attorney, Agent, or Firm* — Fenwick & West LLP

(57) ABSTRACT

A device converts between electrical duplex and optical signals. In one embodiment, such a device includes an echo cancellation circuit that reduces the echo from an incoming optical signal.

17 Claims, 3 Drawing Sheets

ELECTRICAL DUPLEX TO OPTICAL CONVERSION

BACKGROUND

1. Field of the Disclosure

This disclosure pertains in general to data communications, and more specifically to communications using electrical duplex signals and optical signals.

2. Description of the Related Art

For certain applications, particularly for small form factor devices such as mobile phones, it may be desirable to reduce the pin count on electrical connectors. One way to do this is to use duplex communications, where a single channel on the electrical connector is used to both transmit an out-going signal and to receive an incoming signal. However, as the volume of data to be transmitted increases, for example due to more and higher resolution video, the electrical duplex channel may limit the distance over which these signals can be transmitted.

Therefore, there is a need for better approaches to data communication.

SUMMARY

Embodiments of the present disclosure are related to a device that converts between electrical duplex and optical signals. In one embodiment, such a device includes an echo cancellation circuit, an electrical to optical (E/O) converter and an optical to electrical (O/E) converter. The echo cancellation circuit has three ports: a duplex port, a transmit port and a receive port. A transmit signal (Tx signal) propagates along a transmit path from the duplex port through the echo cancellation circuit to the transmit port and then through the E/O converter. The Tx signal enters the device as part of an electrical duplex signal and exits as an optical Tx signal. A receive signal (Rx signal) propagates along a receive path through the O/E converter to the receive port and then through the echo cancellation circuit to the duplex port. It enters the device as an optical Rx signal and exits as part of the duplex signal. The echo cancellation circuit cancels the echo of the Rx signal.

This type of device can be used for many applications, including backwards compatibility to electrical MHL connectors, such as for the CBUS signal on MHL connectors. In one implementation, the device is implemented as a signal converter, with the electrical duplex side implemented as an electrical connector and the optical side implemented as an optical connector. For example, the electrical connector could connect to counterpart MHL electrical connectors, and the optical connector could connect to optical fibers.

In another implementation, two of the devices can be used to create a backwards-compatible MHL optical cable. The two connectors at the ends of the cable are MHL-compatible electrical connectors that handle electrical duplex signals, but the transport media for the cable is optical fiber rather than copper wire.

In yet another implementation, the device is used internally within electronics equipment, for example for transmission of signals across a card or board or within an electronics enclosure.

Other aspects include components, devices, systems, improvements, methods, processes, applications and other technologies related to the foregoing.

BRIEF DESCRIPTION OF THE DRAWINGS

The teachings of the embodiments disclosed herein can be readily understood by considering the following detailed description in conjunction with the accompanying drawings.

Figure (FIG. 1 is a block diagram of a device for converting between electrical duplex and optical forms.

DETAILED DESCRIPTION

The Figures and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
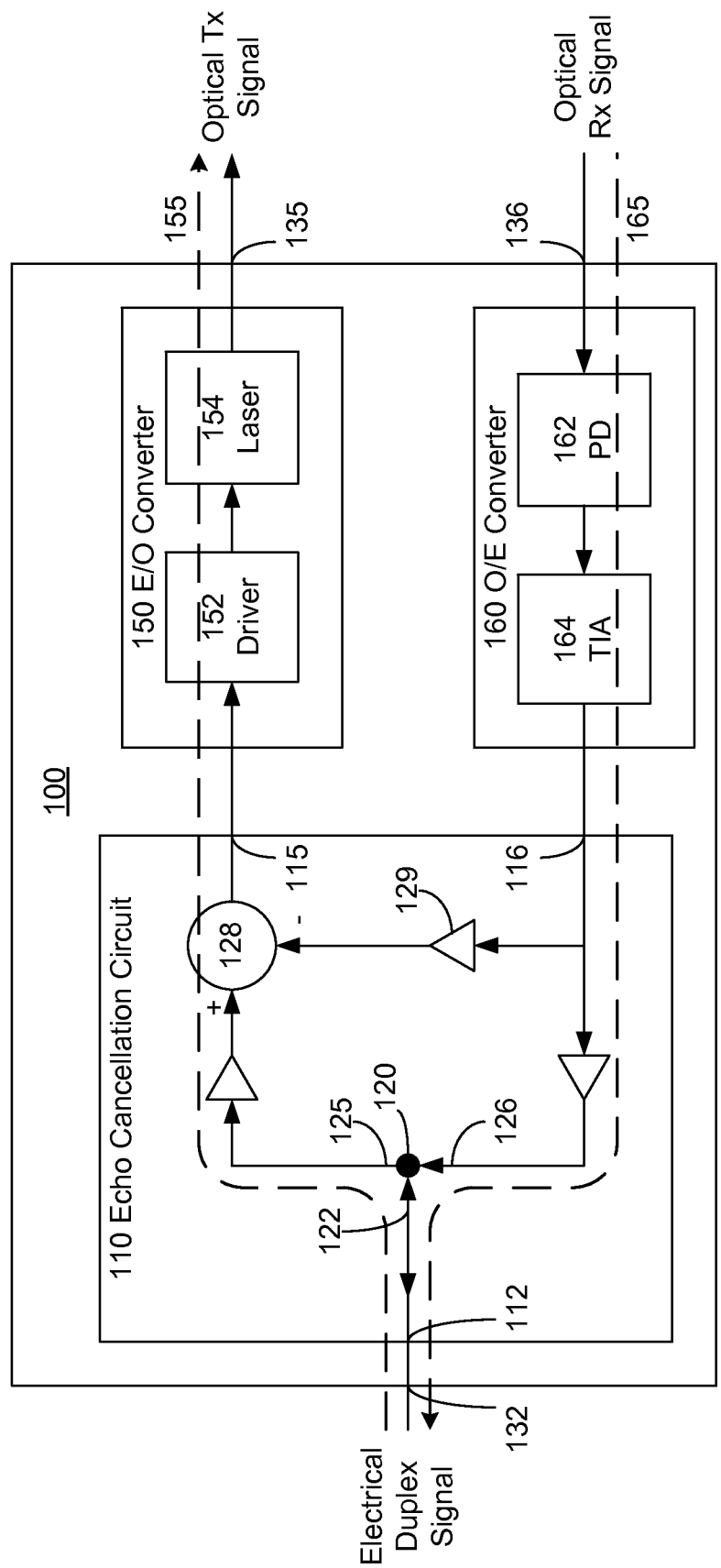

Figure (FIG. 1 is a block diagram of a device 100 for converting between electrical duplex and optical signals. The device 100 includes an echo cancellation circuit 110 (which is intended to include any type of signal extraction or signal subtraction circuit), an electrical to optical (E/O) converter 150 and an optical to electrical (O/E) converter 160. The echo cancellation circuit 110 has three ports, which shall be referred to as a duplex port 112, a transmit port 115 and a receive port 116. The transmit port 115 is coupled to an input of the E/O converter 150. An output of the O/E converter 160 is coupled to the receive port 116.

The three components form two data paths: a transmit data path 155 and a receive data path 165, shown by the dashed lines in FIG. 1. Outgoing signals (referred to as Tx signals) are transmitted along the transmit path 155. They propagate from the duplex port 112, through the echo cancellation circuit 110, to the transmit port 115, and through the E/O converter 150. The Tx signal is received at the duplex port 112 as part of an electrical duplex signal, and is transmitted by the E/O converter 150 as an optical signal. Incoming signals (referred to as Rx signals) are received along the receive path 165. They propagate through the O/E converter 160, to the receive port 116, through the echo cancellation circuit 110, to the duplex port 112. The Rx signal is received at the O/E converter 160 in optical form, and is transmitted at the duplex port 112 as part of an electrical duplex signal. The Rx signal and the Tx signal are communicated as an electrical duplex signal at the duplex port 112.

The echo cancellation circuit 110 separates the Tx and Rx signals. In one approach, the echo cancellation circuit 110 is implemented as an analog circuit. The circuit includes a junction 120 which has three branches 122,125,126 leading to the three ports 112,115,116. The Rx signal comes in through the receive port 116. When it hits junction 120, it splits and propagates down both branches 122 and 125. The Rx signal propagating down branch 122 exits the circuit through duplex port 112, which is the desired signal path. The Rx signal propagating down branch 125 is an undesired echo. The echo is removed by circuit 128, which effectively subtracts the Rx signal from its echo, leaving only the Tx signal.

Circuitry 129 may be used to adjust the amplitude of the subtracted Rx signal to match that of the echo. The other buffers/amplifiers shown may also be used to adjust signal strength. For example, the buffer/amplifier located before circuit 128 on the transmit path 155 may be used to adjust the signal strength, for example in response to different cable lengths or changing environment. In one approach, it is calibrated when the transmit data path is first established.

The Tx signal comes in through duplex port 112 and propagates down branch 125. The Tx signal propagating down branch 125 exits the circuit through transmit port 115, which is the desired signal path.

The E/O converter 150 and O/E converter 160 convert between electrical and optical forms. In some designs, the E/O converter 150 and O/E converter 160 can be implemented by transmit optical sub-assemblies (TOSAs) and receive optical sub-assemblies (ROSAs), respectively. The E/O converter 150 and O/E converter 160 can also be collectively implemented by a transceiver module.

In the example shown in FIG. 1, the E/O converter 150 includes a laser driver 152 coupled to a laser 154. Laser 154 could be a VCSEL or a DFB (distributed feedback) laser, for example. Other light sources could also be used, for example LEDs. The light source could be directly or indirectly modulated.

In the example of FIG. 1, the O/E converter 160 includes a photodetector 162 coupled to a transimpedance amplifier 164.

The device 100 converts between an electrical duplex signal and optical Tx and Rx signals. At a black box level, the device 100 can be modelled as having an electrical duplex port 132, an optical transmit port 135 and an optical receive port 136. The electrical duplex signal is communicated through the electrical duplex port 132, the optical Tx signal through the optical transmit port 135, and the optical Rx signal through the optical receive port 136. The transmit path 155 is from the electrical duplex port 132 to the optical transmit port 135, and the receive path 165 is from the optical receive port 136 to the electrical duplex port 132.

Device 100 can be used for a variety of applications, and its implementation will vary depending on the application. FIGS. 2-5 show a variety of applications based on the Mobile High-Definition Link (MHL) specification, for example the control bus (CBUS) within MHL. MHL is designed to reduce the number of physical pins in the connector, so existing MHL connectors include pins for electrical duplex signals. However, MHL is also designed for the transmission of video, so it must support high data rate transmissions. In order to traverse longer distances, it can be useful to use optical fiber for transport, while maintaining backwards compatibility with existing MHL connectors. In the following examples, the channel carrying the duplex signal will be drawn as a single line/pin, but it should be understood that the physical implementation could include more than one conductor/pin, for example two conductors/pins if the duplex signal is a differential signal.

Figure 2:
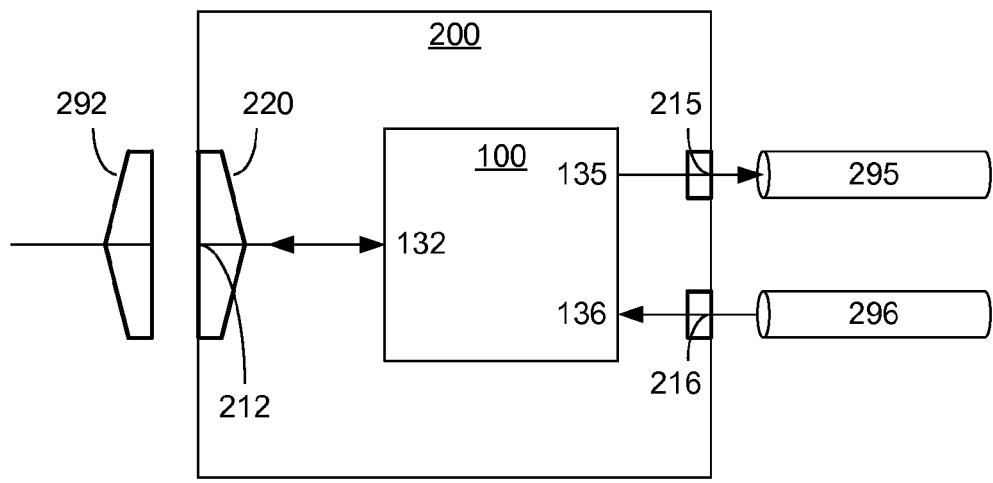
FIG. 2 is a block diagram of a signal converter using the device of FIG. 1.

In FIG. 2, the device 100 is used in a signal converter 200 that converts between electrical MHL signals and a pair of optical signals. In this example, the electrical duplex port 132 is coupled to a pin 212 of an MHL electrical connector 220. MHL connector 220 can be removeably connected to the counterpart MHL electrical connector 292. For clarity, only one pin is shown on each connector 220,292.

The other side of converter 200 connects to optical fibers 295 and 296. More specifically, optical transmit port 135 is coupled to an optical port 215 and the optical receive port 136 is coupled to optical port 216. The fibers 295 and 296 can be connected to the corresponding optical ports 215, 216. The converter 200 could also receive power through its MHL connection, or otherwise.

Figure 3:
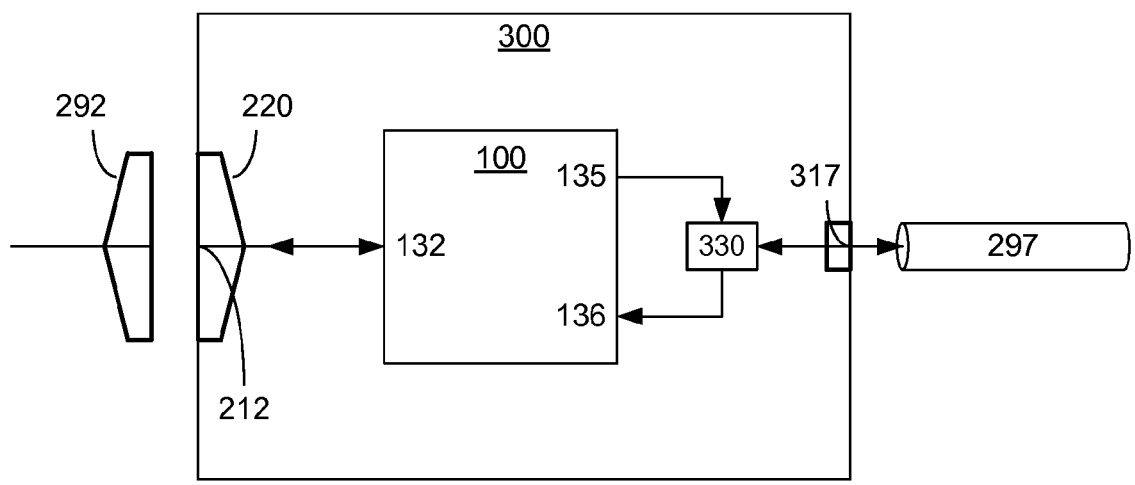
FIG. 3 is a block diagram of another signal converter using the device of FIG. 1.

In FIG. 3, the device 100 is used in a signal converter 300 that converts between electrical MHL and a single optical fiber 297. In this example, the electrical side 292/220 is the same as in FIG. 2. However, the optical Tx signal and optical Rx signal are combined for communication over a single fiber 297. For example, they may be transmitted at different wavelengths and then combined via optical combiner 330, which is coupled to optical port 317. Fiber 297 can be connected to optical port 317. In this way, the optical Tx signal is transmitted over optical fiber 297 using wavelength λ1, while the optical Rx signal is received over optical fiber 297 using different wavelength λ2. Other combining techniques can be used, such as based on polarization, propagation mode, subcarrier, or optical phase.

Figure 4:
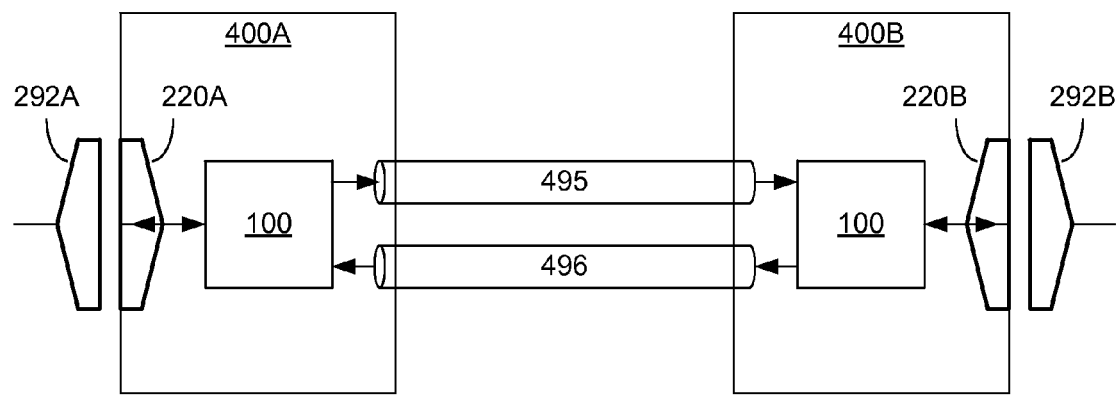
FIG. 4 is a block diagram of a cable using the device of FIG. 1.

FIGS. 2 and 3 show examples where the device 100 is part of a signal converter which can be connected and unconnected to an electrical connector on one side and to optical fiber(s) on the other. FIG. 4 is an example where the device 100 is part of a cable. The cable includes two converters 400A,B connected by two optical fibers 495,496. The converters 400 and fibers 495,496 are permanently connected to each other, forming a cable. The electrical side of the converters 400 are coupled to electrical MHL connectors 220A,B, each of which can be connected and unconnected from their counterpart MHL connectors 292A,B. In this way, an MHL cable can be provided which is backwards compatible with existing electrical MHL connectors, but can provide longer transmission distances due to the use of optical fibers.

Figure 5:
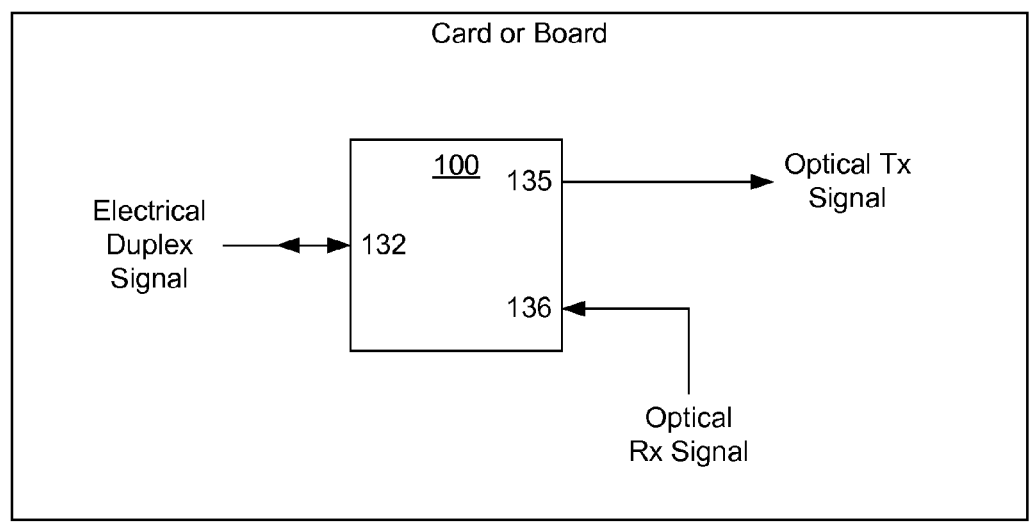
FIG. 5 is a block diagram of an internal use of the device of FIG. 1.

FIG. 5 is an example where the device 100 is used internally in a piece of electronics equipment. For example, the device 100 may facilitate data communications across a card, or between cards or between other locations within the electronics equipment. In this example, there are no removeable connections. The device 100 is permanently connected on the electrical side 132 to handle the electrical duplex signal, and on the optical side 135/136 to handle an optical Tx signal and an optical Rx signal. The optical transport media may be optical fibers, but they may also be other types of optical waveguides or possibly free space transmission.

Upon reading this disclosure, those of skill in the art will appreciate still additional alternative designs. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:
1. A device comprising:
    an echo cancellation circuit having a duplex port, a transmit port and a receive port;
    an electrical to optical (E/O) converter;
    an optical to electrical (O/E) converter;
    a transmit path for transmitting a Tx signal, the transmit path from the duplex port through the echo cancellation circuit to the transmit port and through the E/O converter, the Tx signal transmitted from the E/O converter as an optical Tx signal;

a receive path for receiving an Rx signal, the receive path through the O/E converter to the receive port and through the echo cancellation circuit to the duplex port, the Rx signal received at the O/E converter as an optical Rx signal, the Tx signal and the Rx signal forming an electrical duplex signal at the duplex port;

wherein the echo cancellation circuit cancels the Rx signal received at the receive port from the duplex signal to produce the Tx signal at the transmit port.

2. The device of claim 1 wherein the duplex port of the echo cancellation circuit is coupled to a pin of an electrical connector.

3. The device of claim 2 wherein the electrical connector is removeably connectable to a counterpart electrical connector.

4. The device of claim 3 wherein the counterpart electrical connector is an MHL electrical connector.

5. The device of claim 4 wherein the duplex signal communicates a CBUS of the MIHL protocol.

6. The device of claim 1 wherein the E/O converter is coupled to a first optical pin for an optical connector and the O/E converter is coupled to a second optical port for the optical connector, each optical port adapted to be removeably coupleable to an optical fiber.

7. The device of claim 1 wherein the E/O converter and the O/E converter are both coupled to the same optical port.

8. The device of claim 7 wherein the optical Tx signal and the optical Rx signal are at different wavelengths.

9. The device of claim 1 wherein the Tx signal and the Rx signal are both transmitted between points on a card.

10. The device of claim 1 wherein the Tx signal and the Rx signal are both transmitted between points within an enclosure for electronic equipment.

11. The device of claim 1 wherein the E/O converter comprises a driver coupled to a laser.

12. The device of claim 1 wherein the O/E converter comprises a photodetector coupled to an amplifier.

13. The device of claim 1 wherein the E/O converter and O/E converter are implemented as a transceiver module.

14. The device of claim 1 wherein the E/O converter is implemented as a transmit optical sub-assembly (TOSA).

15. The device of claim 1 wherein the O/E converter is implemented as a receive optical sub-assembly (ROSA).

16. The device of claim 1 wherein:
the duplex port of the echo cancellation circuit is coupled to a pin of an electrical connector; and
the E/O converter and the O/E converter are coupled to one or more optical ports of an optical connector.

17. An optical fiber cable comprising:
two terminals, each terminal comprising:
an echo cancellation circuit having a duplex port, a transmit port and a receive port;
an electrical to optical (E/O) converter;
an optical to electrical (O/E) converter;
a transmit path for transmitting a Tx signal, the transmit path from the duplex port through the echo cancellation circuit to the transmit port and through the E/O converter, the Tx signal transmitted from the E/O converter as an optical Tx signal;
a receive path for receiving an Rx signal, the receive path through the O/E converter to the receive port and through the echo cancellation circuit to the duplex port, the Rx signal received at the O/E converter as an optical Rx signal, the Tx signal and the Rx signal forming an electrical duplex signal at the duplex port;
wherein the echo cancellation circuit cancels the Rx signal received at the receive port from the duplex signal to produce the Tx signal at the transmit port, and the duplex port of the echo cancellation circuit is coupled to a pin of an electrical connector; and
one or more optical fibers coupling optical signals from the E/O converter of one terminal to the O/E converter of the other terminal.

* * * * *